(12) United States Patent
Tsuda

(10) Patent No.: US 11,050,258 B2
(45) Date of Patent: Jun. 29, 2021

(54) BATTERY CONTROL SYSTEM

(71) Applicant: TOYOTA JIDOSHA KABUSHIKI KAISHA, Toyota (JP)

(72) Inventor: Satoshi Tsuda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/803,206

(22) Filed: Feb. 27, 2020

(65) Prior Publication Data

US 2020/0313436 A1 Oct. 1, 2020

(30) Foreign Application Priority Data

Mar. 27, 2019 (JP) ............................. JP2019-059758

(51) Int. Cl.
*H02J 3/32* (2006.01)
*H02J 7/02* (2016.01)
*H02J 7/00* (2006.01)

(52) U.S. Cl.
CPC .............. *H02J 3/32* (2013.01); *H02J 7/0063* (2013.01); *H02J 7/02* (2013.01)

(58) Field of Classification Search
CPC .............. H02J 3/32; H02J 7/0063; H02J 7/02
See application file for complete search history.

(56) References Cited

U.S. PATENT DOCUMENTS

| 2014/0062414 A1* | 3/2014 | Yuhara ...................... H02J 7/345 320/134 |
| 2014/0217989 A1 | 8/2014 | Kudo et al. |
| 2017/0031404 A1* | 2/2017 | Yamamoto ................. G06F 1/28 |

FOREIGN PATENT DOCUMENTS

| JP | 2012-029451 A | 2/2012 |
| JP | 2013162599 A * | 8/2013 ............... H02J 3/32 |
| JP | 2015-006081 A | 1/2015 |
| JP | 2017-163835 A | 9/2017 |
| JP | 2018-007364 A | 1/2018 |

* cited by examiner

*Primary Examiner* — Jared Fureman
*Assistant Examiner* — Duc M Pham
(74) *Attorney, Agent, or Firm* — Oliff PLC

(57) ABSTRACT

A battery control system includes a storage battery connected to a power network to be charged with and discharge power and a control device configured to control charging and discharging of the storage battery. The control device changes details of charging and discharging control of the storage battery when a deterioration state of the storage battery satisfies a predetermined condition at a point in time when a predetermined time has elapsed since start of use. The control device may gradually shift to control for suppressing deterioration of the storage battery as a use time of the storage battery becomes longer. In this way, it is possible to improve the economy of a consumer owning the storage battery.

2 Claims, 3 Drawing Sheets

BATTERY CONTROL SYSTEM

INCORPORATION BY REFERENCE

The disclosure of Japanese Patent Application No. 2019-059758 filed on Mar. 27, 2019 including the specification, drawings and abstract is incorporated herein by reference in its entirety.

BACKGROUND

1. Technical Field

The invention relates to a battery control system that controls charging and discharging of a storage battery.

2. Description of Related Art

A power supply and demand adjusting system has been known that adjusts supply and demand of electric power by controlling charging and discharging of a storage battery owned (or managed) by a consumer.

SUMMARY

When consumers in the same power system have been contracted to an electric utility company in the substantially same details (for example, power classification) or have substantially the same initial performance of installed equipment (for example, battery output), the supply and demand adjustment gain is to be evenly distributed to the individual consumers in light of social fairness (economic fairness in the same region through the supply and demand adjustment). However, in reality, the economy of the consumer largely depends on the asset value of the installed equipment, as well as the supply and demand adjustment gain. For example, when a storage battery is mounted in an electric vehicle, performance deterioration of the storage battery causes the functions (cruising range, power performance, or the like) of the electric vehicles to slow down, which may result in decrease in the trade-in price of the electric vehicle. For this reason, in order to improve the economy of the consumers in the power supply and demand adjusting system, it is preferable to perform control in consideration of the performance deterioration of the storage battery owned by each consumer, which is caused by the use of it, as well as the supply and demand adjustment gain.

The invention has been made in consideration of the aforementioned situation, and an object of the invention is to provide a battery control system capable of improving the economy of a consumer owning a storage battery.

An aspect according to the invention relates to a battery control system. The battery control system includes a storage battery connected to a power network to be charged with and discharge power and a control device configured to control charging and discharging of the storage battery. The control device changes details of charging and discharging control of the storage battery when a deterioration state of the storage battery satisfies a predetermined condition at a time point when a predetermined time has elapsed since start of use.

In the battery control system according to the aspect, the control device may gradually shift to control for suppressing deterioration of the storage battery as a use time of the storage battery becomes longer. With such a configuration, since the decline in the asset value of the storage battery is suppressed in the later stage of use of the storage battery, it is possible to further improve the economy of the consumer owning the storage battery.

In the battery control system according to the aspect, the storage battery may be connected to the power network for power supply and demand adjustment. With such a configuration, since priority is given to the economy by supply and demand adjustment in the earlier stage of use of the storage battery and the decline in the asset value of the storage battery is suppressed in the later stage of use of the storage battery, it is possible to further improve the economy of the consumer owning the storage battery.

With the battery control system according to the aspect, since charging and discharging of the storage battery is controlled based on the deterioration state of the storage battery, it is possible to improve the economy of the consumer owning the storage battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, the configuration and operation of a battery control system according to an embodiment of the invention will be described with reference to the drawings.

Configuration

First, the configuration of the battery control system according to the embodiment of the invention will be described with reference to FIG. 1.

Figure 1:
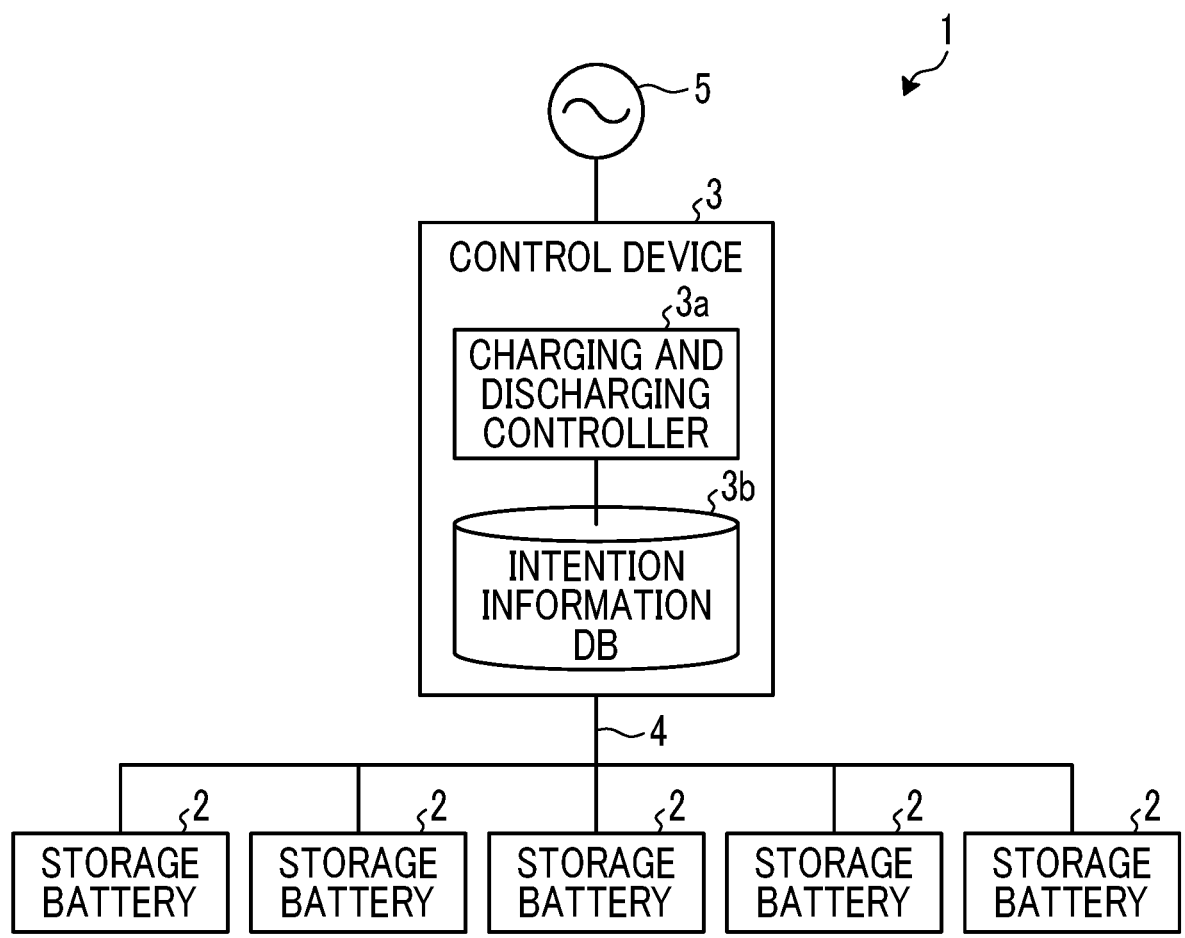
FIG. 1 is a schematic view showing a configuration of a battery control system according to an embodiment of the invention.

FIG. 1 is a schematic view showing a configuration of the battery control system according to the embodiment of the invention. As shown in FIG. 1, the battery control system 1 according to the embodiment of the invention is a system (for example, virtual power plant system) for adjusting power supply and demand by controlling charging and discharging of a plurality of storage batteries 2 owned (or managed) by consumers in the same power system, and includes the storage batteries 2 and a control device 3 as main components.

The storage batteries 2 may include known storage batteries, for example storage batteries that are mounted in a vehicle such as an electric vehicle or a hybrid vehicle or household storage batteries, and are owned by respective consumers in the same power system. Each storage battery 2 is connected to the power network 4 of the same power system, and is configured such that charging and discharging operation can be controlled by the control device 3.

The control device 3 includes an information processing device such as a computer installed at a power station. The control device 3 may be provided for each storage battery 2. The control device 3 controls the operation for supplying, to the storage batteries 2, the power generated by a generating facility 5, which is owned by a power utility company, through the power network 4, and the operation for supplying the charging power of the storage batteries 2 to another power system through the power network 4.

In the embodiment, the control device 3 functions as a charging and discharging controller 3a by an operation processing unit, such as a central processing unit (CPU) in the information processing device, executing a computer program. The function of the charging and discharging controller 3a will be described later. In addition, the control device 3 includes intention information database (intention information DB) 3b storing intention information indicating the intention of each consumer about the operation of the storage battery 2 used for a battery control process to be described later. The intention information of each consumer is acquired from each consumer in advance through a telecommunication line or the like and stored in the intention information DB 3b.

In the battery control system 1 having such a configuration, the economy of the consumer owning the storage battery 2 is improved by the charging and discharging controller 3a of the control device 3 executing a battery control process shown below. Hereinafter, with reference to a flowchart shown in FIG. 2, the operation of the charging and discharging controller 3a when the battery control process is executed will be described.

Battery Control Process

Figure 2:
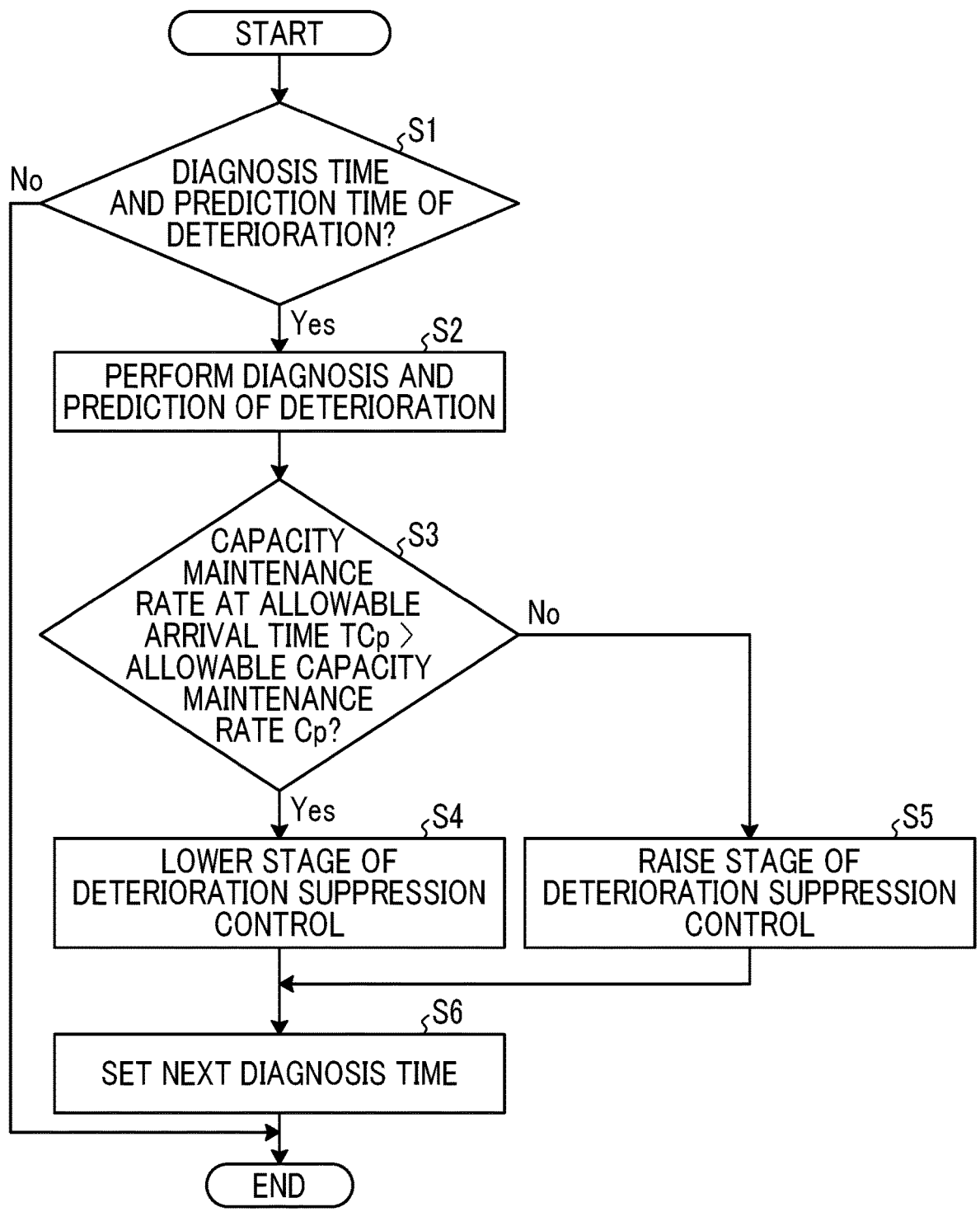
FIG. 2 is a flowchart showing a flow of a battery control process according to the embodiment of the invention.

FIG. 2 is a flowchart showing a flow of the battery control process according to the embodiment of the invention. The flowchart shown in FIG. 2 starts at the timing when the storage battery 2 is connected to the power network 4, and the battery control process proceeds to step S1. It is assumed that the battery control process is implemented separately for each storage battery 2 connected to the power network 4. In addition, it is assumed that the battery control process is repeatedly executed every time a predetermined time has elapsed from the end of the previous battery control process while the storage battery 2 is connected to the power network 4.

In the processing of step S1, the charging and discharging controller 3a determines whether or not a preset diagnosis time and a prediction time of the deterioration state of the storage battery 2 are arrived at. The diagnosis time and the prediction time of the deterioration state of the storage battery 2 are set based on the intention information of the consumer stored in the intention information DB 3b. However, when the consumer's intention is not explicitly indicated, a setting value on the system may be used. Moreover, in the process of using the storage battery 2, the diagnosis time and the prediction time of the deterioration state of the storage battery 2 may be provided a plurality of times (for example, once a month).

As a result of the determination, when the diagnosis time and prediction time of the deterioration state of the storage battery 2 are reached (Yes in step S1), the charging and discharging controller 3a allows the battery control process to proceed to step S2. On the other hand, if the diagnosis time and prediction time of the deterioration state of the storage battery 2 are not reached (No in step S1), the charging and discharging controller 3a ends the battery control process.

In the processing of step S2, the charging and discharging controller 3a diagnoses the current deterioration state of the storage battery 2 by a known method using the output current value, temperature and the like of the storage battery 2. For example, the charging and discharging controller 3a reads data indicating the deterioration state of the storage battery 2 corresponding to an integrated value of the square of the output current value until now, from a table showing the relationship between the integrated value of the square of output current value and the data indicating the deterioration state of the storage battery 2.

In addition, the charging and discharging controller 3a calculates the prediction value of the capacity maintenance rate of the storage battery 2 at an allowable arrival time TCp set by the consumer, based on the intention information of the consumer owning the storage battery 2 stored in the intention information DB 3b and the deterioration state of the storage battery 2 in the current state. Here, the capacity maintenance rate indicates the ratio of the capacity of the storage battery 2 to the capacity (initial value) when the initial value of the storage battery 2 before the start of use is 1. For example, when the capacity of the storage battery 2 is 0.8, the capacity maintenance rate is calculated to be 0.8. Thereby, the processing of step S2 is completed and the battery control process proceeds to step S3.

In the processing of step S3, the charging and discharging controller 3a determines whether or not the prediction value of the capacity maintenance rate of the storage battery 2 at the allowable arrival time TCp calculated in the processing of step S2 is greater than an allowable capacity maintenance rate Cp set by the consumer, based on the intention information of the consumer stored in the intention information DB 3b. As a result of the determination, when the prediction value of the capacity maintenance rate of the storage battery 2 at the allowable arrival time TCp is greater than the allowable capacity maintenance rate Cp (Yes in step S3), the charging and discharging controller 3a allows the battery control process to proceed to step S4. On the other hand, when the prediction value of the capacity maintenance rate of the storage battery 2 at the allowable arrival time TCp is equal to or less than the allowable capacity maintenance rate Cp (No in step S3), the charging and discharging controller 3a allows the battery control process to proceed to step S5.

In the processing of step S4, the charging and discharging controller 3a lowers the stage of the deterioration suppression control on the storage battery 2, such as the charging and discharging suppression level and the temperature control level. That is, the charging and discharging controller 3a controls charging and discharging of the storage battery 2 with priority given to economy (gain from power trading) and fairness within the same region due to supply and demand adjustment. Thereby, the processing of step S4 is completed and the battery control process proceeds to step S6.

In the processing of step S5, the charging and discharging controller 3a raises the stage of the deterioration suppression control on the storage battery 2. That is, the charging and discharging controller 3a controls charging and discharging of the storage battery 2 with priority given to deterioration suppression of the storage battery 2. Specifically, the charging and discharging controller 3a adjusts (sets, executes, predicts, or learns) the stage of the deterioration suppression control such that the prediction value of the capacity maintenance rate of the storage battery 2 at the allowable arrival time TCp is equal to or greater than the allowable capacity maintenance rate Cp, and becomes the smallest. For example, as a result of calculating, at the time T=T1 shown in FIG. 3, the capacity maintenance rate of the storage battery 2 at the allowable arrival time TCp, a case will be described in which it is predicted that the capacity maintenance rate of the storage battery 2 changes along the curve L2 and the capacity maintenance rate of the battery 2 at the allowable arrival time TCp is equal to or less than the allowable capacity maintenance rate Cp.

Figure 4:
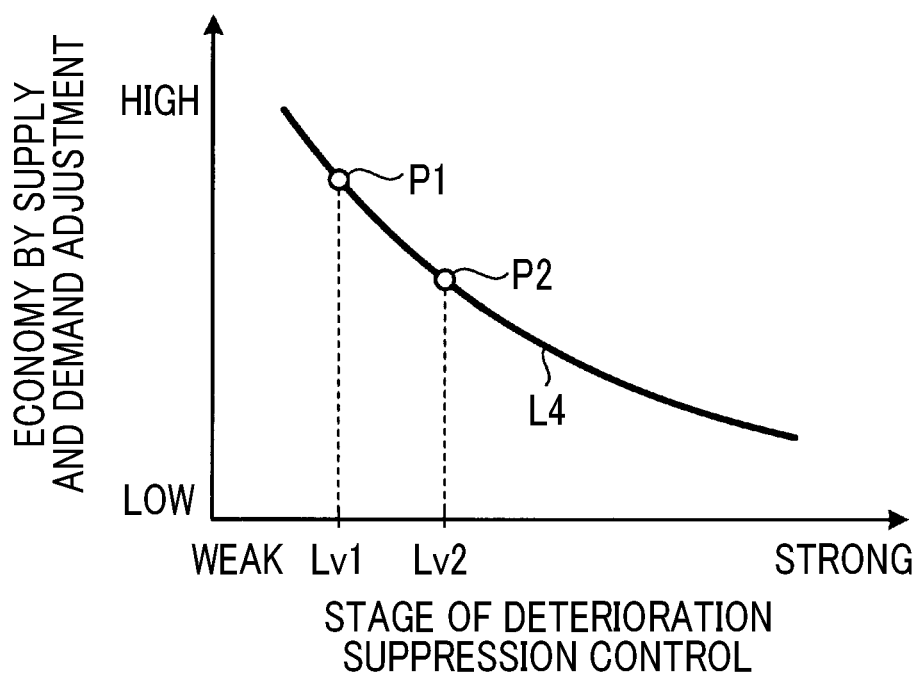
FIG. 4 is a view of an example of a relationship between economy by supply and demand adjustment and a stage of a deterioration suppression control.

In this case, when the stage of the deterioration suppression control, which corresponds to the curve L2, is a stage Lv1 (point P1) of the deterioration suppression control shown FIG. 4, the charging and discharging controller 3a controls charging and discharging of the storage battery 2 by adjusting the stage of the deterioration suppression control to a stage Lv2 (point P2) of the deterioration suppression control at which the economy is reduced by the supply and demand adjustment, such that the capacity maintenance rate of the storage battery 2 changes along the curve L3 where the capacity maintenance rate of the storage battery 2 at the allowable arrival time TCp is the allowable capacity maintenance rate Cp.

Figure 3:
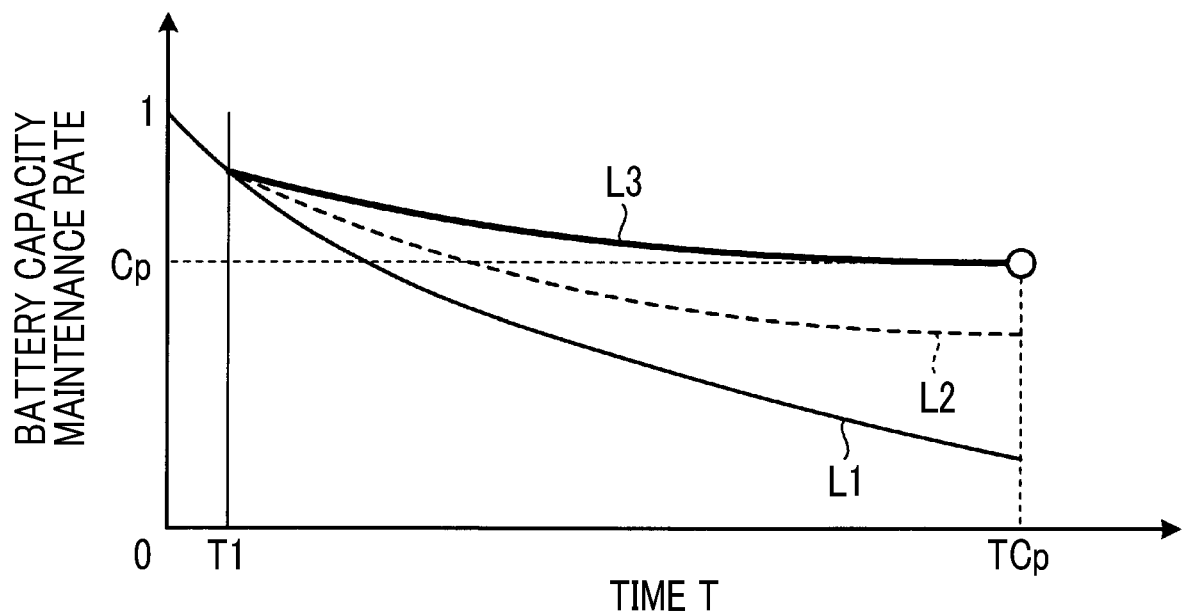
FIG. 3 is a view showing an example of a time change of a battery capacity maintenance rate.

A curve L1 in FIG. 3 shows a change with time of the battery capacity maintenance rate when the economy by supply and demand adjustment is given top priority. Further, a curve L4 in FIG. 4 is a curve showing the relationship between the economy by supply and demand adjustment and the stage of the deterioration suppression control, and is stored in the control device 3 in advance. The change curve of the battery capacity maintenance rate shown in FIG. 3 and information on the current value may be presented to the consumer such that the consumer can grasp the deterioration state of the storage battery 2 in real time. Thereby, the processing of step S5 is completed and the battery control process proceeds to step S6.

In the processing of step S6, the charging and discharging controller 3a sets the next diagnosis time and the prediction time of the deterioration state of the storage battery 2 based on the intention information of the consumer stored in the intention information DB 3b. With such a processing, adjustment of the stage of the deterioration suppression control can be provided a plurality of times. Thereby, the processing of step S6 is completed and the battery control process ends.

As is clear from the above description, in the battery control process according to the embodiment of the invention, the charging and discharging controller 3a changes the details of the charging and discharging control of the storage battery 2 when the prediction value of the capacity maintenance rate of the storage battery 2 at the allowable arrival time TCp is equal to or less than the allowable capacity maintenance rate Cp. With such a configuration, since charging and discharging of the storage battery 2 is controlled based on the deterioration state of the storage battery 2, the consumer owning the storage battery 2 can avoid unexpected reduction in the asset value, and the economy of the consumer owning the storage battery 2 can be improved. Moreover, each consumer can operate the storage battery 2 after grasping the asset depreciation.

In addition, in the battery control process, which is the embodiment of the invention, the charging and discharging controller 3a gradually shifts to control for suppressing deterioration of the storage battery 2, as the use time of the storage battery 2 is long. With such a configuration, since the decline in the asset value of the storage battery 2 is suppressed in the later stage of use of the storage battery 2, it is possible to further improve the economy of the consumer owning the storage battery 2.

In addition, in the battery control process, which is the embodiment of the invention, the storage battery 2 is connected to the power network 4 for the power supply and demand adjustment. With such a configuration, since priority is given to the economy by supply and demand adjustment in the earlier stage of use of the storage battery 2 and the decline in the asset value of the storage battery 2 is suppressed in the later stage of use of the storage battery 2, it is possible to further improve the economy of the consumer owning the storage battery 2.

Although the embodiment to which the invention made by the inventors is applied has been described above, the invention is not limited to the description and drawings of the embodiment which are part of the disclosure of the invention. That is, other embodiments, examples, applied techniques, and the like made by those skilled in the art are all included in the scope of the invention.

What is claimed is:

1. A battery control system comprising:
    a storage battery connected to a power network to be charged with and discharge power; and
    a processor programmed to:
        control charging and discharging of the storage battery;
        change details of charging and discharging control of the storage battery when a deterioration state of the storage battery satisfies a predetermined condition at a time point when a predetermined time has elapsed since start of use; and
        gradually shift to control for suppressing deterioration of the storage battery as a use time of the storage battery becomes longer.

2. The battery control system according to claim 1, wherein the storage battery is connected to the power network for power supply and demand adjustment.

* * * * *